United States Patent [19]

Jeal et al.

[11] Patent Number: 4,765,010
[45] Date of Patent: Aug. 23, 1988

[54] METHOD OF MAKING A STEM FOR A SELF-PLUGGING BLIND FASTENER

[75] Inventors: Harvey P. Jeal, Stevenage; Frederick A. Summerlin, Wheathampsted, both of England

[73] Assignee: Advel Limited, Hertfordshire, England

[21] Appl. No.: 78,851

[22] Filed: Jul. 28, 1987

Related U.S. Application Data

[62] Division of Ser. No. 883,816, Jul. 9, 1986.

[30] Foreign Application Priority Data

Jul. 12, 1985 [GB] United Kingdom ............... 85/17659

[51] Int. Cl.⁴ ........................... B21K 1/44; B21K 1/58
[52] U.S. Cl. ....................................... 10/27 R; 72/377
[58] Field of Search .................. 10/10 R, 27 R, 27 E; 72/365, 366, 372, 377; 411/15, 34–38, 41–43

[56] References Cited

U.S. PATENT DOCUMENTS

| | | | |
|---|---|---|---|
| 3,044,332 | 7/1962 | Siebol | 72/90 |
| 3,073,205 | 1/1963 | Siebol | 85/40 |
| 3,292,482 | 12/1966 | Fry et al. | 411/43 |
| 3,390,601 | 7/1968 | Summerlin | 411/43 |
| 4,230,017 | 10/1980 | Angelosanto | 411/43 X |
| 4,365,495 | 12/1982 | Francis | 10/27 R X |
| 4,627,775 | 12/1986 | Dixon | 411/34 |

FOREIGN PATENT DOCUMENTS 2123107 1/1984 United Kingdom .
2159595 12/1985 United Kingdom ................. 411/34

Primary Examiner—E. Michael Combs
Attorney, Agent, or Firm—Oblon, Fisher, Spivak, McClelland & Maier

[57] ABSTRACT

A self-plugging blind fastener of the break-stem type, is suitable for fastening apertured sheets together, and comprises a headed tubular body and an elongate stem disposed in the bore of the body. The stem comprises a plug, and a stem-tail connected to the plug by a breakneck which is concealed by overlapping lips. The plug has a stop face, and an annular locking groove between the breakneck and the stop face. The body has a deformable locking collar upstanding above an adjacent region of the upper surface of the head. The diameter of the bore reduces, to provide a stop face and a locking region of smaller diameter, within the head. The fastener is set by pulling the plug into the bore until the stop faces meet, to form a blind head, and then deforming the collar to force the body to bulge into the locking groove of the plug.

4 Claims, 9 Drawing Sheets

Fig. 1.
Fig. 2.
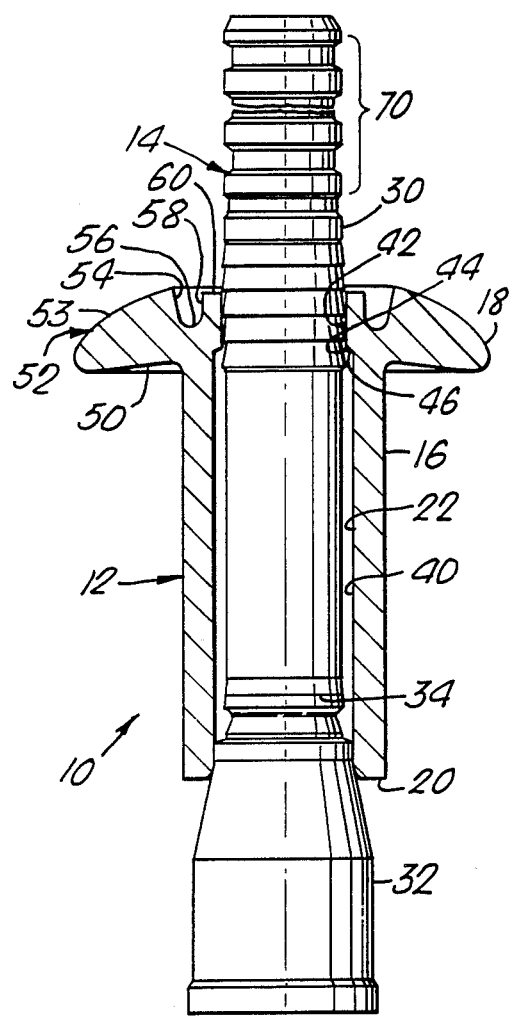
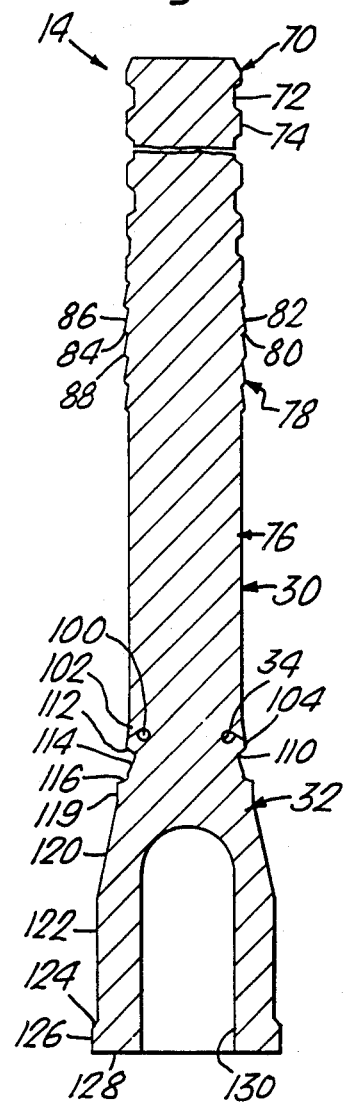

METHOD OF MAKING A STEM FOR A SELF-PLUGGING BLIND FASTENER

This is a division, of application Ser. No. 883,816, filed July 9, 1986.

This invention relates to a self-plugging blind fastener, such as a blind rivet or blind bolt, and more particularly, although not exclusively, to a self-plugging blind fastener which comprises a headed tubular body, and an elongate stem which, for installation of the fastener, can be pulled along a bore in the body and whereby the body can be deformed to form a blind head, and wherein the fastener comprises means whereby at least part of the stem can be locked in the body of the installed fastener, and thus be retained as a plug within the body where it may contribute to the strength of the installed fastener and be subject to little risk of becoming separated from the body.

The fastener may be of the break-stem type in which the stem has a breakneck at which the stem will eventually break during installation so as to leave part of the stem plugging the tubular body and allow the other part of the stem to be discarded.

Such fasteners are well known, and some examples are described in our British Patents numbered 1066033 and 1538872.

However, the provision of locking means in self-plugging blind fasteners has in the past, given rise to various consequential problems or disadvantages, such as, for example, the need to provide very powerful or delicate tools for installing the fasteners, inability to ascertain whether effective locking has been achieved in the installed fastener, lack of pretension in the installed fastener and, in general terms, difficulty in meeting various desirable criteria.

It is therefore an object of the invention to provide a self-plugging blind fastener having efficient means for locking the plugging part of the stem in the body, and in which consequential problems can be avoided or minimised to the extent that its advantages outweigh its disadvantges.

In attempting to avoid or overcome such consequential problems, it was necessary to find solutions to a number of fundamental problems. Solutions were found, and as a result, preferred forms of self-plugging blind fastener embody a number of individual features which cooperate together to render the performance of the fastener satisfactory.

In particular, we have devised means whereby, in a self-plugging blind fastener of the kind referred to, the stem and body may be assembled ready for use so that the stem is retained by the body, and the fastener can be manipulated without risk of the parts becoming separated prior to use. It will be appreciated that the utility of such means is not necessarily restricted to self-plugging fasteners which also include means for locking part of the stem in the body, but the particular means devised for retaining the parts of the fastener in the assembled condition has further utility when associated with a particular form of locking means in that, during installation of the fastener, it serves as a centring means to centre the stem accurately within the bore of the body, and thereby prevents misalignment of the stem and body which could have a deleterious effect on the locking of the plug within the body.

Thus, there is a cooperative relationship between the centring means and the locking means.

Furthermore, we have devised an unconventional stem for a breakstem fastener of the type referred to, and a method of making the stem, which stem has a breakneck defined by an annular groove (referred to colloquially as a "breaker groove") which is so constructed as to resist the ingress of material under pressure into the groove. While a stem having such a breaker groove is not located in its utility to self-plugging breakstem fasteners which also incorporate locking means, it is of particular utility when associated with locking means in a fastener of the type in which, during installation of the fastener, the body is subjected to forces which are necessary to achieve locking but which could tend to cause material of the body to enter a breakergroove of conventional form, and thus impede the installation of the fastener or impair its operation. Thus, there is a cooperative relationship between the breakergroove of the unconventional stem, and the locking means.

According to one aspect of the invention, there is provided a self-plugging blind fastener, comprising a tubular body and a stem, the body having an elongate shank having a blind end, a radially enlarged preformed head at the other end of the shank, and a bore extending axially throughout the body from the blind end to the head end of the body, the bore having a main region extending through the shank from the blind end towards the head end to a stop face, and a locking region of smaller diameter than the main region extending from the stop face to head end of the body, said preformed head having an underhead surface adjacent to the shank, and an upper surface remote from the shank; the stem comprising a plug and, integrally connected to the plug, an elongate stem-tail whereby the plug can be pulled along the bore from the blind end towards the head end, the plug having shank-engaging means remote from the stem-tail for engaging the shank at a position remote from the preformed head, and a stop face intermediate between the shank-engaging means and the stem-tail for abutting the stop face of the body, whereby, on pulling the plug along the bore until the stop face of the plug abuts the stop face of the body, the shank will be deformed so as to form a blind head, the fastener having locking means comprising a part of the body which is deformable under increasing axial compressive load so as to project into the locking region of the bore, and a part of the plug adjacent to the stem-tail which provides a locking flank facing away from the stem-tail for abutting the part of the body so caused to project, wherein the said deformable part of the body comprises an annular locking collar integral with the preformed head and concentric with the bore, and having a radially inner surface facing into the locking region of the bore, and a radially outer surface having a diameter substantially smaller than that of the preformed head, the locking collar being upstanding above an annular region of the upper surface of the head immediately adjacent to and peripherally of the collar, and wherein the stopface between the main and locking regions of the bore is located within the head of the body, and the plug has a circumferential locking groove between the locking flank and the stop face of the plug for receiving the part of the body caused to project, the axial distance between the stop-face of the plug and the locking face being not less than the axial distance between the stop-face of the body and the said annular region of the upper surface of the head, the stem having means for supporting the deformable part of the body and thereby preventing it from projecting into the bore until the locking groove reaches a position within the locking region in which to receive the projecting part.

The stem-tail may have a plurality of swageable annular flanges of which the diameters are such as to be an interference fit in the bore of the body, whereby the stem can be retained in the bore of the body with the stem-tail extending through the bore in interference with the body and projecting from the head end, and with the expanding portion of the plug adjacent to the blind end of the body.

The stem may comprise a plug, and a stem tail joined to the plug by a breakneck which forms the root of an annular breaker groove, the stem-tail and the plug each have a lip which overhangs the breaker groove, the lip of the stem-tail overlapping the lip of the plug.

According to another aspect of the invention, there is provided a self-plugging blind fastener, comprising a headed tubular body having an elongate shank, a radially enlarged preformed head at one end of the shank and a bore extending axially throughout the head and shank, and an elongate stem comprising a plug, and, integrally connected to the plug, an elongate stem-tail whereby the plug can be pulled into the bore at the blind end of the body, the plug having a tapered expanding portion which increases in diameter in the direction away from the stem-tail and which is capable, on being pulled into the bore at the blind end, of expanding the shank to form a blind head, wherein the plug has a locking groove adjacent to the stem-tail for receiving material of the body which, during installation of the fastener, will be deformed into the locking groove, the locking groove having a steep locking flank on the side of the groove adjacent to the stem-tail for abutting such deformed material, and a stop face between the locking groove and the expanding portion, and wherein the bore of the body has a main region extending from the blind end through the shank, a locking region extending from the head end towards the main region and of smaller diameter than the main region, and a stop face for abutting the stop face of the stem between the locking region and the main region, and wherein the head of the body has a annular relief groove extending in the axial direction of the head end of the body towards the blind end, the relief groove being concentric with and spaced radially from the locking region of the bore, and an annular locking collar, concentric with the bore, between the bore and the relief groove, the locking collar being integrally attached to the head in a region between the root of the relief groove and the stop face of the body, and being deformable by a force applied to the head end of the collar in a direction having components acting axially and radially inwardly, to produce a radially inwardly extending bulge of material having a shape substantially complementary to the shape of the locking groove.

According to a further aspect of the invention, there is provided a method of making a stem for a self-plugging blind rivet of the breakstem type, which method comprises first forming a stem-blank comprising a plug-blank and a stem-tail blank, and then rolling the stem-blank between suitably profiled tools to form an annular groove between the plug-blank and the stem-tail blank, and thereby forming a breakneck which connects the plug-blank to the stem-tail blank and circumferential flanges adjacent to and on each side of the groove from material displaced from the groove, and then rolling the flange on the plug-blank to form a lip which overhangs the groove, and then rolling the flange on the stem-tail blank to form a lip which overhangs the groove and overlaps the first formed lip.

Self-plugging blind fasteners comprising a body and stem, and embodying the several features referred to, will now be described, by way of example, with reference to the accompanying drawings, in which:

FIG. 1 is an elevation, partly in section, of the self-plugging blind fastener;

FIG. 2 is a sectional elevation of the stem of the fastener;

Figure 3:
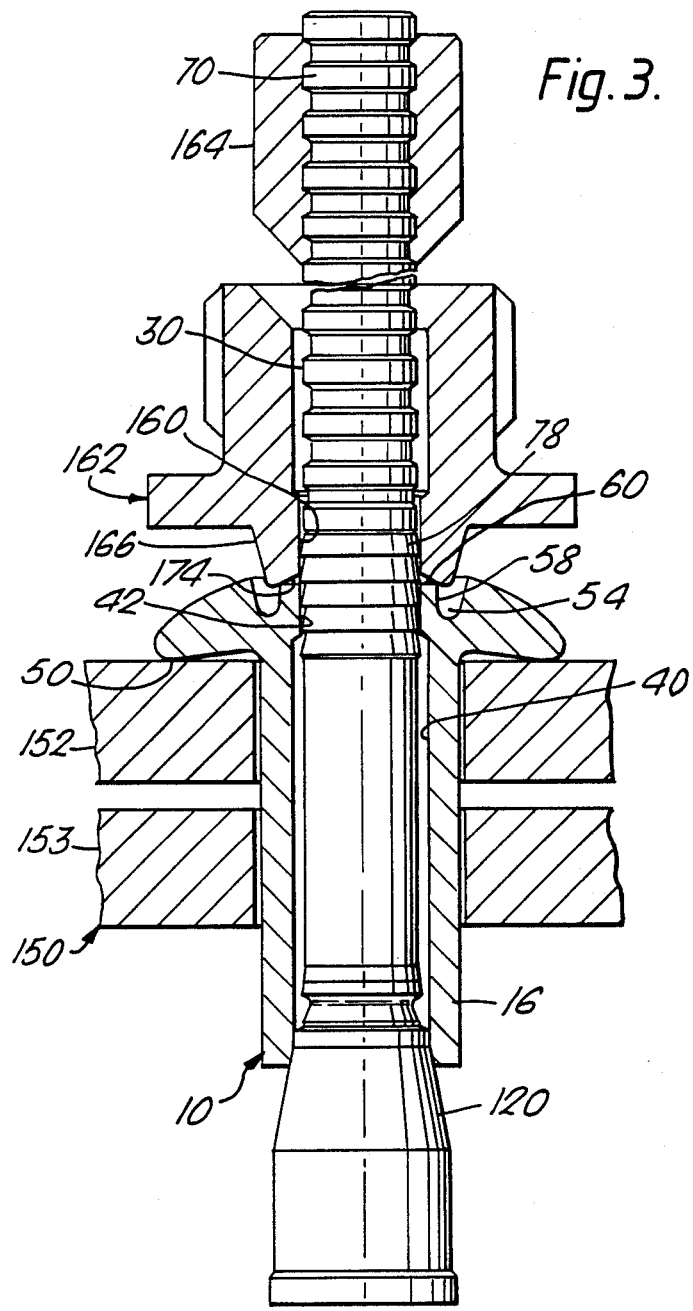
FIG. 3 is an elevation, partly in section, showing the fastener of FIG. 1 together with an apertured workpiece in which the fastener is to be installed, and part of a tool used for the installation of the fastener.

Referring to the drawings, and first more particularly to FIG. 1, a self-plugging blind fastener 10 comprises a tubular body 12 and a stem 14 which, prior to use of the fastener and usually during its manufacture, are assembled together to form a unitary structure ready for installation in a workpiece.

The body 12 is formed of a malleable material, such as aluminium or annealed steel of moderate hardness, and has an elongate shank 16 and a radially enlarged preformed head 18 formed integrally with the shank at one end (the "head end") of the body. The other end of the body is hereinafter referred to as the "blind end", and is indicated by the reference 20.

A bore 22 extends axially, through the head 18 and the shank 16, throughout the length of the body 12.

At all cross-sections transverse to its axis, the body 12 is circular, internally and externally.

The fastener of this embodiment is of the "breakstem" type, and the stem 14 comprises an elongate stem-tail 30 and a plug 32 which is integrally connected to the stem-tail by a concealed narrow breakneck 34. The breakneck 34 is made the weakest part of the stem 14 so that, when the stem is subjected to axial tension, it will break at the breakneck rather than elsewhere. More particularly, the fastener is of the type in which the plug is pulled into the bore of the body at the blind end so as to radially expand a part of the shank adjacent to the blind end, and thereby form a blind head. In other embodiments of the invention however, other arrangements can be adopted for enabling the formation of a blind head during the setting of the fastener as will be understood by those skilled in the art of blind fasteners. Part of the plug 32 in a region adjacent to the breakneck 34 is of sufficiently small diameter to be able to enter a short distance into the bore 22 at the tail end of the body, but, in a region more remote from the breakneck, the diameter of the plug becomes substantially greater than that of the bore 22, so that it can only enter the bore further by expanding the shank 16 radially.

The body 12 and stem 14 are assembled together prior to use so that the plug 32 is adjacent to the blind end 20 of the body and only partly within the bore 22, and the stem-tail 30 extends along the bore and projects from the head end of the body. The fastener includes means for retaining the body and stem in the assembled condition ready for use, as will become apparent.

The bore 22 in the body has a main region 40 extending from the blind end, through the shank, and into the head 18 where it is stepped to provide a locking region 42 having a slightly smaller diameter than that of the main region 40, and a shoulder 44 at the junction between the locking region and the main region. The locking region 42 of the bore extends from the shoulder 44 to the head end of the bore 22. The shoulder 44 presents an annular stop face 46 located within the head, and which faces generally towards the blind end 20. While the stop face could be flat and lie at right angles to the axis, it is satisfactory and easier to form it, as in this embodiment, as an inwardly-facing frusto-conical surface. We prefer to form the stop face 46 so that it tapers towards an included apical angle of about 150 degrees.

The bore 22 may be flared slightly or radiused where it meets the blind end of the body so as to avoid the formation of a sharp corner which might have a harmful effect on the plug 32 when the latter is drawn further into the bore 22.

In this embodiment, the head 18 is of the type known as "round head", but the body could be formed with a raised head of a shape other than round, or with a countersunk head instead of a round head.

Thus, the head 18 has a slightly dished underhead surface 50 facing towards the blind end and slightly nearer to the blind end than is the stop face 46, and an upper surface 52 facing generally away from the blind end of the body.

The upper surface 52 of the head 18 comprises an outer peripheral part 53 and, radially inwardly of the peripheral part 53, an annular region 56. The annular region 56 is concentric with, and spaced radially outwardly from, the locking region 42 of the bore 22.

The part of the head between the annular region 56 and the locking region of the bore constitutes an annular locking collar collar 58. The locking collar is upstanding above the annular region 56 and is integrally attached to the rest of the body in the region of the head lying between the annular region 56 and the locking region 42.

The locking collar 58 is concentric with the bore, and presents a radially inner surface which faces into the locking region 42.

The outer peripheral part 53 is convexly curved, and rises to a level above, or more remote from, the blind end than that of the annular region 56. Thus, in this embodiment, the annular region 56 constitutes the root of an annular relief groove 54 between the radially outer surface of the collar 58 and the raised peripheral part 53.

The locking collar extends from the region in which it is attached, towards the head end of the body, to terminate, at its free end 60, slightly below that level of the peripheral part which is most remote from the blind end 20.

The stem 14 of this embodiment is of the type adapted initially to form a blind head at the tail end of the body on being pulled so that the plug 32 of the stem enters further into the bore 22 and radially expands to a large extent part of the shank adjacent to the tail end of the body. Subsequently, the plug may be drawn further along the main part of the bore, expanding more of the shank within a hole of suitable diameter in a workpiece in which the fastener is being installed, so as to fill the hole. Finally, the plug may be locked in position within the bore of the body so as to plug the bore more or less permanently and resist forces which may tend to drive the plug out of the bore in the direction opposite to that in which it entered, and the stem-tail 30 may be removed on fracture of the breakneck 34.

Referring now also to FIG. 2, the stem-tail 30 has a grooved pulling portion 70 adjacent the end of the stem-tail 30 remote from the plug 32.

The pulling portion 70 has a plurality of annular pulling grooves 72, some thirty three in number, between which are defined a plurality of annular ribs 74 which facilitate gripping and pulling of the stem by means of a suitable tool. Such tools are well known and generally comprise an annular anvil for abutting the head of the fastener and through which the projecting part of the stem-tail can pass, and gripping jaws movable relative to the anvil for gripping and pulling the stem-tail while the head of the fastener body is supported by the anvil.

All the ribs 74 have substantially the same diameter which is made to be such that the pulling portion 70 is able to pass with a little clearance through the locking region 42 of the bore of the body, and the tool used for installing the fastener is also chosen to be such that the pulling portion is able to pass through the annular anvil of the tool with some clearance.

Adjacent to the pulling portion 70 and substantially spaced from the breakneck 34 by a cylindrical portion 76, is a centralising portion 78.

The cylindrical portion 76 has a cylindrical, smooth surface throughout its length, and a diameter which is substantially the same as that of the ribs 74 so that the cylindrical portion is able to enter the locking region 42 of the body, preferably with slight clearance although it may be a very slight interference fit.

The centralising portion 78 has two functions, namely, to provide interengagement between the stem 14 and body 12 whereby the stem may be retained within the body to form an assembly ready for use, and to ensure that the stem-tail is accurately centred in the body and the anvil of the installation tool during installation of the fastener in a workpiece.

Accordingly, the centralising portion 78 is formed with a plurality of annular assembly grooves 80, about five in number, and between each pair of adjacent assembly grooves the material of the stem rises in the form of a swageable annular flange 82. The assembly grooves 80 are generally of V-shape, as seen in a longitudinal section of the shank, having a radiused root and an included angle between their flanks of 80 degrees–90 degrees, but are asymmetrical about a plane normal to the axis of the stem, so that each of the flanges 82 has a short abutment flank 84 facing away from the pulling portion 70, and a long leading flank 86 nearer the pulling portion, the flanks meeting at an annular crest 88.

The short abutment flanks 84 are steeply inclined to the axis of the stem, and form an angle of 10 degrees with a plane normal to the stem axis, and the long leading flanks 86 are less steeply inclined, and generally form an angle of 70 degrees–80 degrees with a plane normal to the axis. In this embodiment, the leading flanks 86 are relieved slightly adjacent to the crests so as to sharpen the angle at the crests between the leading and abutment flanks.

The diameters of all the flanges 82, taken at the crests 88, are the same as each other and such as to be an interference fit in the locking region 42 of the bore of the body. Furthermore, in a tool suitable for installing the fastener, the annular anvil has an internal diameter substantially similar to that of the locking region 42 of the fastener body, so that the flanges are also an interference fit in the aperture of the anvil.

Alternatively, it would be possible for the several flanges to have diameters which increase slightly from one to another in the direction away from the pulling portion 70 and towards the plug 32, but not in the opposite direction, as will become evident.

As the annular flanges 82 are swageable, they are able to yield on being drawn into a bore or aperture of slightly smaller diameter in a direction such that the long leading flanks 86 of the flanges 82 are leading while the respective short abutment flanks 84 are trailing, with the crests 88 of successive flanges being swaged down to the diameter of the bore or aperture into which they are drawn. However, on being drawn in this manner into the locking region 42 of the bore of the body, the body exhibits sufficient resilience to permit the flanges 82 to pass with only slight swaging, and may then recover sufficiently to engage behind the short abutment flank 84 of the last flange to pass out of the head end of the locking region of the bore 22.

Due to the asymmetric shape of the flanges, once any of them has passed out of the head end of the bore 22, it is not able to re-enter the body except upon the application of a force sufficiently great to overcome the abutting relationship between the steeply inclined abutment flank 84 of that flange and the body. Such a force would have to be considerable, and the arrangement can be relied upon to resist forces normally encountered during handling of the fastener prior to installation, and to maintain the stem and body in the assembled condition ready for use.

In order to assemble the body 12 and the stem 14, the stem-tail 30 is inserted into the blind end 20 of the body so that the pulling portion 70 of the stem-tail extends through and beyond the locking region 42 of the bore 22, and the centralising portion 78 of the stem-tail lies in the main region 40 of the bore. Sufficient force is then applied to draw (or drive) the centralising portion into the locking region 42 while supporting the body, so that at least one of the flanges 82 passes beyond the head end of the bore, and the plug 32 comes into abutment with the blind end 20 of the body without actually causing any radial expansion of the blind end of the body.

In practice, we find that, by reason of the natural resilience of the body, the free end of the locking collar 58 tends to close behind the flange last to emerge from the free end of the body sufficiently to provide adequate resistance to separation of the assembled stem and body. However, in order to ensure that even better resistance to separation is achieved, we prefer to positively deform the head end of the locking collar 58 into the assembly groove trailing the flange last to emerge, so that the collar is better able to abut the abutment flank 84 of the flange last to emerge and thus resist even a substantial force tending to push the stem out of engagement with the body. Thus the body and the stem are held assembled in the relationship shown in FIG. 1.

As previously indicated, the centralising portion 78 serves also to centralise the stem-tail in the body and in the anvil of a tool used to install the fastener. It will be readily appreciated that the entry of the centralising portion into the locking region of the bore will result in the stem-tail assuming a position concentric with the bore of the body.

Similarly, it will also be appreciated that, as the part of the stem-tail which projects beyond the head end of the body includes one or more of the flanges 82, when the projecting part of the stem-tail is inserted into the central aperture of an annular anvil 162 of a tool to be used for installing the fastener, the one or more flanges on the projecting part will cause the stem-tail to become accurately centred in the anvil. This will, in turn, ensure that the anvil will become aligned concentrically with the body and, in particular, with the locking collar 58, as can be seen in FIG. 3.

As previously indicated, the plug 32 is connected to the stem-tail 30 by the breakneck 34, and in this embodiment the breakneck is concealed. The breakneck is formed approximately midway between the ends of an axially-short, smoothly tapered portion 92 of the stem, in which portion the diameter of the stem increases very slightly and progressively from that of the cylindrical portion 76, which is usually slightly less than that of the locking region 42 of the bore, to a greater diameter which will give a definite interference with the body in the locking region 42. More particularly, the breakneck 34 is a portion of the stem having a smaller diameter than any other part of the stem, and forms the root of an annular breaker groove 100 formed in the tapered portion 92 and shown in FIG. 2.

In this embodiment, the stem-tail 30 and the plug 32 each have a lip, 102 and 104 respectively, and each of the lips partly over-hangs the breaker groove. The lip 102 of the stem slightly overlaps the lip 104 of the plug, with the lips meeting along a frusto-conical plane at which the free end of the lip 104 is radially inward of the lip 102, and the mouth of the breaker groove is thus closed by the overlapping lips. When, during installation of the fastener, the stem is pulled so that the plug 32 moves towards the head 18 of the body, the smoothly tapered portion 92 is able to enter the locking region 42 with progressively increasing interference, yet, by reason of the overlapping arrangement of the lips 102, 104 in which the lip 102 is leading but encloses the free end of the lip 104, there is no tendency for the underlying lip 104 to be picked up by or snag, the body.

Next to the tapered portion 92, and closely adjacent to the breakneck 34, the plug 32 has an annular locking groove 110 having a shape and function reminiscent of the assembly grooves 80, but of generally larger dimensions. Thus, the locking groove is of somewhat greater depth than the assembly grooves, although less deep than the breaker groove, and has a short, steep, locking flank 112, analogous to the abutment flanks 84, on the side of the groove 110 adjacent to the breakneck, and a long, less steep, blending flank 114 on the side remote from the breakneck, and a radiused root between the flanks.

During installation of the fastener, the body 12 is subjected to a compressive force which, due to the shape and size of the anvil of the installation tool and the particular construction of the body in the region of the locking collar and locking region 42 of the bore, tends to deform the material of the body in this region to produce a bulge of somewhat particular shape and which projects radially inwardly into the locking region 42.

The purpose of the locking groove 110 is to receive this inwardly-projecting bulging material, and the locking flank 112 provides an abutment against which the bulging material can abut, so that the shear strength of the bulging material will resist a substantial axial force which may tend to push the plug out of the body in the direction opposite that in which the plug is pulled during installation.

The blending flank 114 extends longitudinally to a point at which the diameter of the plug approaches a diameter the same as the maximum diameter of the tapered portion 92, at which point the diameter of the plug increases abruptly to a diameter substantially the same as, or very slightly less than, the diameter of the main region 40 of the bore 22 of the body, thus providing a stop face 116 on the plug. The stop face 116 is immediately adjacent to the locking groove and faces generally towards the stem-tail 30. On pulling the stop face 116 into abutting engagement with the stop face 46 of the body, the stop face 116 substantially prevents further movement of the plug towards the head end of the body, and therefore the axial load applied then begins to cause the body to deform and bulge inwardly into the locking groove 110.

The stop face 116 may be at right angles to the axis of the stem, but it is more convenient to make it, as in this embodiment, of frusto-conical shape having a large apex angle of not less than about 150 degrees and, most conveniently, about 160 degrees.

Beyond the locking groove 110, on the side remote from the breakneck, the plug has a short cylindrical portion 119 and then progressively increases in diameter to provide shank-engaging means in the form of a frusto-conical, tapering, expanding portion 120 which reaches a maximum diameter substantially greater than the diameter of the main region 40 of the bore of the body. The frusto-conical expanding portion 120 tapers at an included angle of about 50 degrees and is the part of the plug which is instrumental in engaging the shank 16 and expanding it from the blind end to form the blind head during installation of the fastener.

Beyond the expanding portion 120, the diameter of the plug remains constant through an elongate cylindrical portion 122, and then increases through a short steep taper 124 to a terminal cylindrical sealing land 126 which serves to provide increased resistance to entry of this portion of the plug into the body, and provides tightly sealing interengagement between the plug and the expanded shank after installation.

The plug terminates at an annular end-face 128, and a bore 130 extends axially from the end-face 128, through the plug as far as the plane at which the expanding portion 120 meets the cylindrical portion 122. The bore 130 has a diameter sufficiently large to substantially weaken the plug so that the plug will more easily undergo wiredrawing in a known manner when the plug is pulled into the body during installation.

The installation of the fastener 10 in an apertured workpiece 150 will now be described, with reference initially to FIG. 3. The workpiece 150 comprises two apertured members 152, 153 which are to be fastened together. The members 152, 153 are assembled together face to face with their apertures registering, and the fastener 10 is inserted into the registering apertures so that the underhead surface 50 of the body abuts the near side of the workpiece, and the shank 16 extends through the workpiece and projects beyond the opposite side (the "blind side") of the workpiece. Either at this stage or, if desired, prior to insertion of the fastener into the workpiece, the projecting stem-tail 30 is inserted through a central aperture 160 of an annular anvil 162 of a suitable installation tool, represented in the drawings only by the anvil 162 and a pair of gripping-and-pulling jaws 164, so that the pulling portion 70 of the stem enters into engagement with the jaws 164. It will be noted that in order to be suitable for setting the fastener 10, the anvil 162 has a forwardly projecting, externally tapered, tip 166 the external diameter of which is greater than the external diameter of the collar 58 but less than the major diameter of the annular relief groove 54. The tool is then actuated to grip and pull the stem-tail, so that the stem-tail enters progressively further into the tool through the aperture of the anvil. This brings the anvil relatively nearer to the preformed head 18 of the fastener, during which time the centralising portion 78 of the stem begins to enter the aperture 160 of the anvil. As previously explained, the crests 88 of succesively entering flanges are swaged, on entering the aperture 160 and the locking region 42 of the body to the extent necessary to enter, and this ensures that the stem is accurately centred in the annular anvil, and, in turn, that the anvil becomes aligned concentrically with the fastener about the axis of the stem.

Eventually, the tip of the anvil comes into abutment with the head end of the locking collar 58 of the fastener body, without engaging the peripheral part 53, as shown in FIG. 3, whereupon movement of the anvil relative to the body substantially stops and relative movement begins to occur between the stem and the body.

Figure 4:
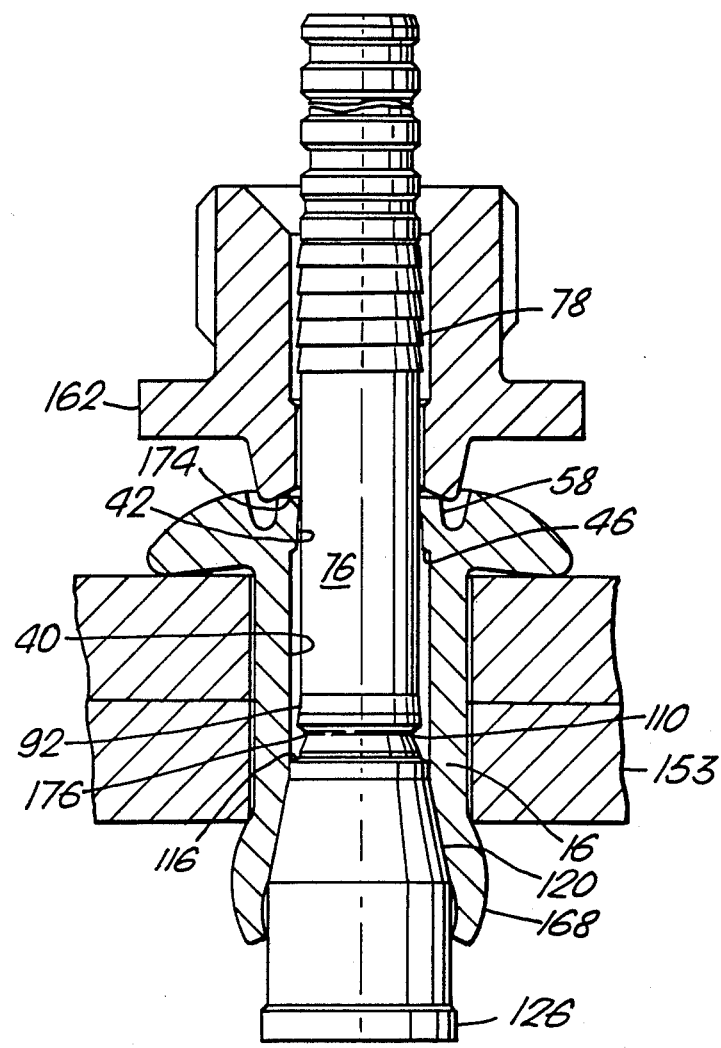
FIG. 4 is a view similar to FIG. 3 but showing an early stage in the installation of the fastener.

The tapered expanding portion 120 of the plug then enters progressively into the main region 40 of the bore, expanding the shank 16 radially outwardly to form a blind head 166 of larger diameter than the aperture in the blindside member of the workpiece as shown in FIG. 4. As the expanding portion 20 enters further into the bore 22, the reaction force of the tip of the anvil acting on the collar 58 increases progressively, and by reason of the shape and geometry of the anvil and the body in the region of the collar, tends to cause the material in the collar region of the body to bend and move radially inwardly. However, it will be perceived that after the plug has been pulled but a short distance into the body, the centralising portion 78 of the stem will have passed entirely through the locking region 42 of the bore and the smooth cylindrical portion 76 will have entered the locking region, as shown in FIG. 4, so that, in as much as the bending collar material will tend to bear with pressure on the stem, this pressure will be borne by the smooth cylindrical portion throughout much of the travel of the stem. Thus, the cylindrical portion 76 will support the collar and enable it to substantially resist actual bulging, and by reason of its smooth surface, friction between the stem and collar is of a low order.

With continued pulling of the stem, the tapered portion 92 enters and passes along the locking region 42 of the bore 22, followed immediately by the locking groove 110, until the stop face 116 on the plug abuts the stop face 46 of the body. At the same time, the plug will have wiredrawn and elongated, mainly in the region traversed by the bore 130, and due particularly to the increased resistance to entry of the sealing land 126 into the body. Like the cylindrical portion 76, the tapered portion 92 also serves to support the collar against bulging, and, together with the cylindrical portion 76, constitutes means for supporting the deformable part of the body in the collar region until the locking groove is in a position in which to receive bulging material of the body. The distance between the stop face 116 and the breakneck 34 is substantially the same as the distance between the stop face 42 and the free end of the collar. Consequently, when the stop faces abut, the breakneck is substantially level with the free end of the collar, and the locking groove 110 is entirely within the locking region 42 and in register with a region 170 of the body which is intermediate between and spaced from the free end of the collar 58 and the stop face 46. In axial position, the region 170 corresponds generally with the annular region 56 at the root of the annular relief groove 54.

Figure 5:
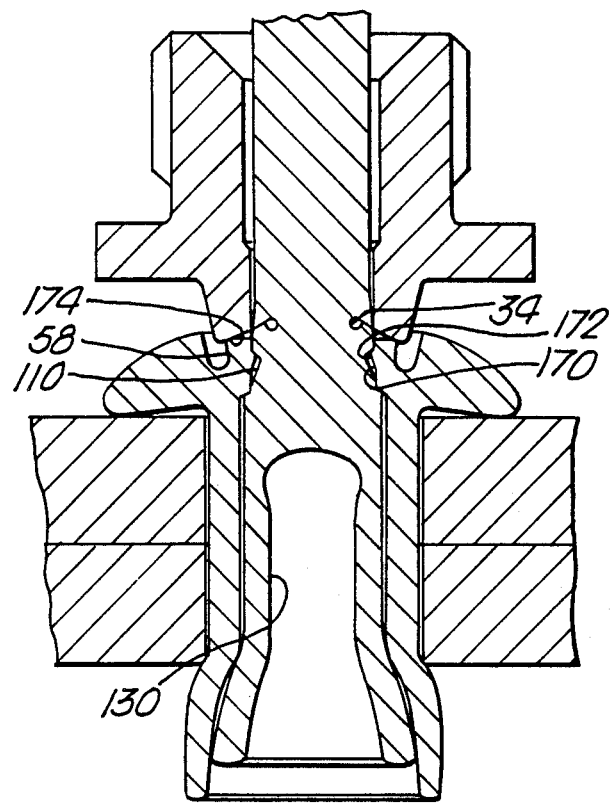
FIG. 5 is a view generally similar to that of FIG. 4 but showing a later stage in the installation of the fastener, and in which the stem is shown in sectional elevation and partly broken away.
Figure 6:
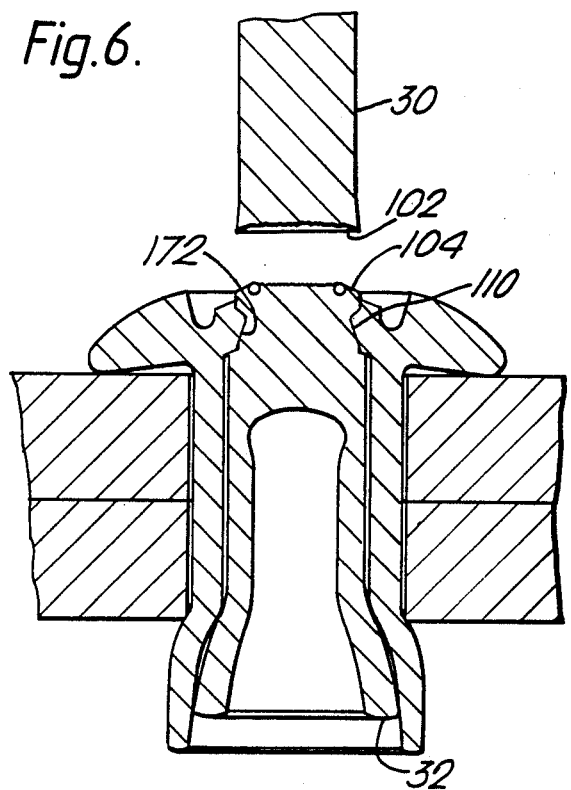
FIG. 6 is a view similar to FIG. 5 showing the fastener and workpiece on completion of installation and with the tool removed.

Once the stop faces 46 and 116 abut together, further axial movement of the stem is substantially arrested, and consequently the load applied by the anvil 162 to the free end of the collar 58 increases greatly. As the region 170 of the body is now in register with the locking groove 110, it is no longer supported by the stem and therefore begins to deform substantially under the applied load as shown in FIG. 5, forming a bulge of material 172 which enters, and eventually may substantially fill, the locking groove 110. Once the bulging material has substantially filled the locking groove, the load required to produce further deformation of the body again increases to a value which the breakneck 34 is unable to sustain. Consequently, the stem breaks at the breakneck, allowing the stem-tail to be discarded and leaving the plug 32 locked in the body by virtue of the interengagement of the bulge of material 172 in the locking groove 110, as shown in FIG. 6.

The shape and extent of the deformation produced in the bulging region 170 depends to some extent upon the configuration of the body in the region of the locking collar 58 and the shape of the tip of the anvil, as well as the malleability of the material to be deformed and the force applied thereto.

Accordingly, the shape and dimensions of the relief groove 54 and locking collar 58 are chosen to be such that when the fastener is installed using a suitable tool, the bulge of material 172 will natually assume a shape which will readily enter and substantially fill the locking groove 110 with little if any need for its shape to be modified by the locking groove.

It is particularly important that the axial distance between the stop face 46 and the free end 60 of the collar be kept short, in order that the length of material which will be subjected to axial compression between the anvil and the stop face 46, and thus caused to bulge, shall be axially short. As a result, the bulge formed will tend to rise more steeply and to a greater height over the short distance than it would over a larger distance. In addition, by locating the stop face 46 within the head, the radially large mass of the head provides hoop restraint which tends to reduce the extent to which material in the region below the level of the upstanding collar will bulge. Consequently, the bulge will be asymmetrical in the axial direction, protruding into the locking region to a greater extent in the region of the upstanding collar than in the lower part of the locking region which is surrounded by the mass of the radially enlarges part of the head.

It is also important that the tip 166 of the anvil should be dimensioned so as to engage the collar 58 without engaging any part of the upper surface 52 of the head 18 radially outward of the collar, and preferably the face of the tip 166 which actually engages the collar 58 should be shaped so as to act on the collar with a force having a component which tends to drive the collar radially inwardly as well as axially.

Thus, in the anvil 162 illustrated, the tip has a loading face 174 whereby the collar can be engaged, and which is shaped in the form of a frusto-conical recess having an apical angle of 50 degrees so that it will actually engage the free end of the collar 58 at its outer periphery. As a result, the anvil exerts on the collar both axial and radially inward forces, the vector of which passes obliquely to the axis of the body, through the region 170 which is intended to form the bulge, and into the locking region 42 of the bore. The resultant force causes the material peripherally of the locking region to collapse and form the annular bulge 172. The apical angle of the loading face 174, and the shape and dimensions of the annular relief groove 54 and hence of the locking collar 58, are chosen empirically with a view to ensuring that the deformation produced during installation will yield a bulge 172 which will exhibit high shear strength when subjected to an axial load applied in the direction towards the blind end 20.

Similarly, the shape of the locking groove 110 is made to be substantially complementary to the shape of the bulge 172, so that the bulging material is able to move into the locking groove and substantially fill it without the need for any substantial modification of the shape of the bulging material, and so that the locking flank 112 of the locking groove will load the bulge in shear when a force is applied to the plug of the installed fastener which will tend to push the plug towards the blind end of the body.

However, it will be appreciated that the locking groove is capable of exerting some moulding action on the bulging material, and advantage can be taken of this fact to make the shape of the locking groove such that it will improve the shape of the bulge if desired.

Thus, the locking flank 112 can be inclined at an angle in the range of 10 degrees to 45 degrees to the normal to the axis of the stem, and in this embodiment is inclined to the normal at an angle of about 30 degrees.

The blending flank 114 should be inclined to the normal to the axis at an angle greater than that of the locking flank so that the locking groove embraces a greater axial length of the stem than would a symmetrical groove. The angle between the blending flank 114 and the normal to the axis can be in the range 45 degrees to 70 degrees, and in this embodiment is about 68 degrees.

The locking groove 110 has a radiused root 176 between its flanks.

As previously indicated, the portion 92 is tapered, reaching its maximum diameter adjacent the locking groove 110. Although it is not essential that the stem should be so tapered adjacent the groove 110, the presence of such a taper is advantageous in that the last part of the stem to enter the aperture 160 of the anvil increases progressively to a diameter which will be an interference fit in the aperture 160. Thus, not only does it ensure that this portion of the stem is accurately centred in the anvil, but also that there will be no gap between the stem and the wall of the aperture of the anvil into which material of the locking collar 58 could migrate.

The arrangement of the lips 102 and 104 which close the mouth of the breaker groove is advantageous in that when, during installation of the fastener, body material in the region 170 bears against the stem as the stem passes along the locking region of the bore, the underlying lip 104 gives support to the overlapping lip 102 so that the lips are able to withstand the pressure of the body material.

In the fastener 10 of the foregoing embodiment, the outer peripheral part 53 of the upper surface of the head 18 rises to a level slightly higher than the free end 60 of the locking collar 58, and since, during setting of the fastener, the locking collar will be axially compressed so as to cause its free end 60 to move towards the blind end 20, it is possible to arrange that the dimensions of the fastener, and in particular the distance between the breakneck 34 and the stop face 116 of the plug, are such that, when the stem breaks at the breakneck, the break will occur at a level below the highest level of the outer peripheral part 53 of the upper surface of the head, thus avoiding the possibility of the plug protruding beyond the head end of the body in the set fastener. This may be regarded as desirable aesthetically as well as reducing the risk of a blow inadvertently loosening or driving out the plug from the body. However, it is not necessary for the upper surface 52 of the head to have a peripheral part rising to a level above that of the annular region 56 which is immediately adjacent to and peripherally of the locking collar 58.

Figure 7:
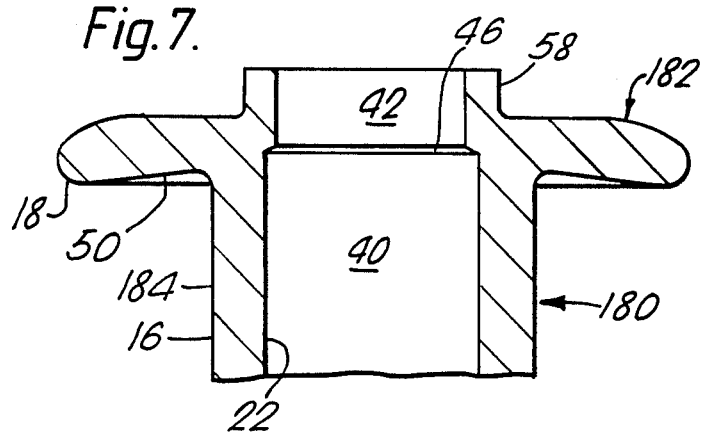
FIG. 7 is a fragmentary sectional elevation of part of another form of fastener embodying the invention.
Figure 8:
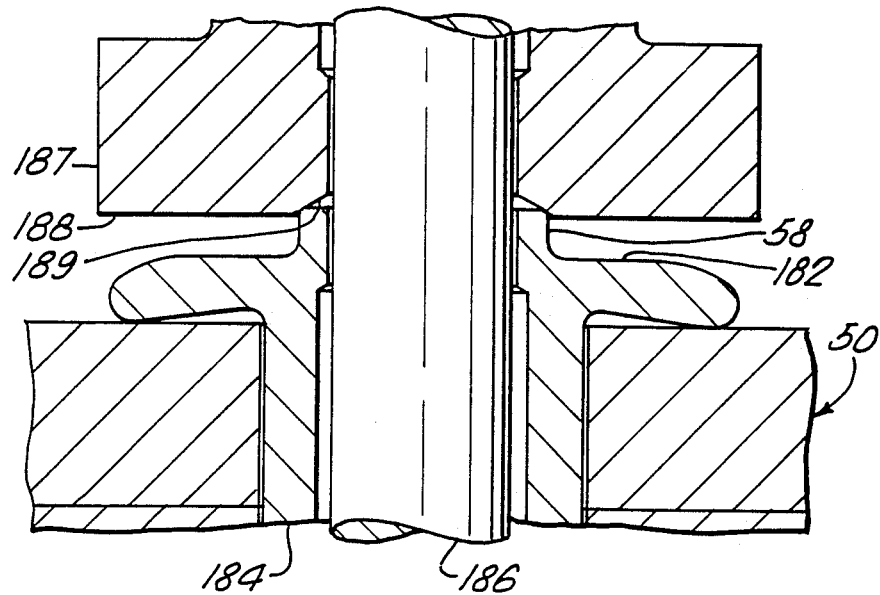
FIG. 8 is a fragmentary sectional elevation showing an early stage in the installation of the fastener of FIG. 7.
Figure 9:
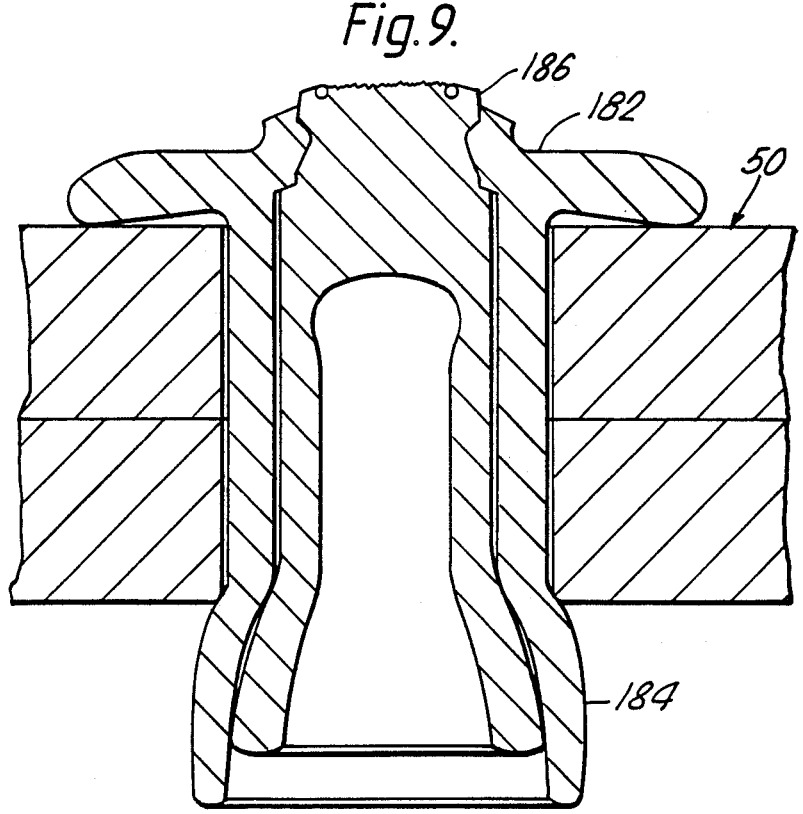
FIG. 9 is a sectional elevation showing the fastener of FIG. 7 after installation in a workpiece.

Thus, referring now to FIGS. 7, 8, and 9 of the drawings, there is shown fragmentarily part of another fastener 180 according to the invention which differs from the fastener 10 only in that the head of the body has an upper surface 182 which has no peripheral part rising above a radially inner part immediately adjacent to the locking collar. In other respects, the fastener 180 is similar to the fastener 10, and has corresponding features which are indicated by the same reference numerals.

Thus the fastener 180 comprises a body 184 and a stem 186 (shown in FIG. 8), the body having a shank 16, a preformed head 18, and a bore 22 having a main region 40 extending through the shank and into the head, and a locking region 42 within the head, there being a stop face 46 at the junction of the main and locking regions. The head has a dished underhead surface 50 slightly nearer to the blind end than is the stop face 46, and the upper surface 182 of the head is slightly rounded near its outer periphery. Radially inwardly from the outer periphery of the head, is a flat annular region concentric with the locking region of the bore, and an upstanding locking collar 58. It will be appreciated that, in this embodiment, the entire upper surface 182 of the head is recessed below the level of the free end of the upstanding locking collar 58, so that the collar is relieved effectively in the same manner as the collar of the embodiment of FIG. 1 is relieved by presence of the relief groove 54.

However, the absence of a raised peripheral part enables the fastener 180 to be set using an annular anvil 187, as shown in FIG. 8, and having no projecting tip of restricted diameter such as the tip 166 of the anvil 162. Instead, the anvil 187 has a substantially planar front face 188 which may eventually abut the upper surface 182 of the head and provide the reaction necessary to enable the stem-tail to be broken off after the collar has been deformed, and a frusto-conical loading face 189, which can be slightly recessed into the front face, for actually engaging and compressing the locking collar.

In all other respects, the fastener 180 is similar, in construction and behaviour during setting, to the fastener 10 except that, after setting, the retained plug part of the stem stands slightly proud above the upper surface 182 of the head, as shown in FIG. 9.

Figure 10:
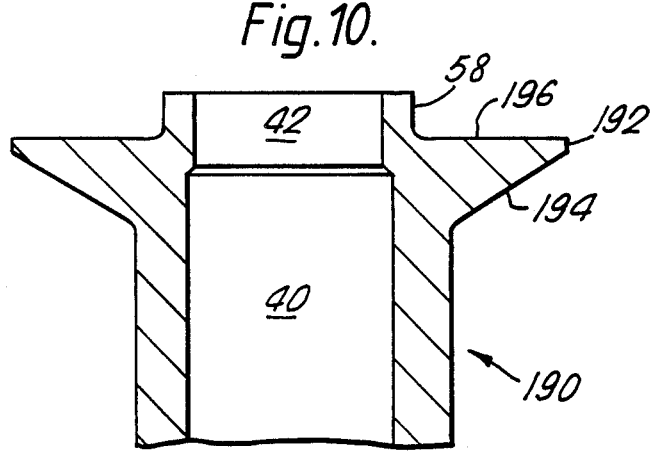
FIG. 10 is a fragmentary sectional elevation showing part of yet another form of fastener embodying the invention.

FIG. 10 shows part of a fastener 190 of another embodiment which is similar to the fastener 180 in all respects save that it has a body having a preformet head 192 having an underhead surface 194 of frusto-conical shape, and a flat upper surface 196 peripherally of an upstanding locking collar 58, so that the preformed head 192 is generally of the shape known as "countersunk". The method by which the closed breaker groove 100 is formed will now be described.

The stem 14 of the fastener 10 is formed by first forming a stem-blank, and then subjecting the stem-blank to a finishing operation in which the configuration of the stem is imparted to the stem-blank. Such a general method has become standard practice in the manufacture of conventional stems for fasteners of various types, and it is usual to form a stem-blank of suitable basic form by turning or cold-heading suitable wirestock, and then subjecting the stem-blank to a rolling operation analogous to thread-rolling, in which the desired details of the configuration of the stem are imparted to the blank. A number of individual features of the finished stem may be imparted more or less simultaneously in a single rolling operation using suitable composite tools, or the several features may be imparted individually, the former practice being more appropriate to mass production of stems. Thus, for example in the stem 14, the breaker groove could be formed individually or at the same time as the pulling grooves and/or the locking groove, but it should be borne in mind that the formation of one feature may have a consequent effect upon another previously or simultaneously formed feature.

The method aspect of this invention is concerned primarily with the formation of a breakfast groove to define a breakneck, and provides a method whereby a groove is formed and then closed, so as to conceal the groove and enclose the breakneck in order that ingress of extraneous material into the groove may be resisted. However, in a preferred method, the locking groove is formed while the breaker groove is being formed, and its formation is used to influence the configuration of the breaker groove.

Basically, a breaker groove is formed in a stem by rolling a stem-blank 200 comprising a plug-blank 202 and a stemtail-blank 204, between pairs of forming tools which are applied to the stem blank with 200 suitable pressure.

Figure 11:
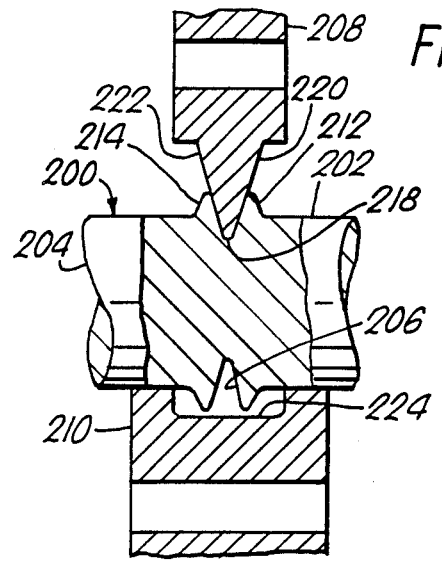
FIGS. 11, 12 and 13 show three successive stages in a method of forming a stem.

In forming the breaker groove, a symmetrical V-shaped groove 206 is formed in a first stage by rolling between a groove-forming tool 208 and a supporting tool 210 as shown in FIG. 11. The groove-forming tool 208 is suitably profiled to cause the material of the blank to flow and be deformed to form the groove 206 with a profile complementary to the shape of the working surface of the tool 208. In doing so material of the blank is displaced from the groove so formed. The displaced material remains integral with the blank and forms circumferential flanges 212, 214, on each side of and immediately adjacent to the groove 206, the flanges projecting radially outwardly beyond the original profile of the blank. The tool 208 is made to penetrate the blank to such a depth as to leave a breakneck of predetermined diameter at the core of the blank.

The groove-forming tool 208 is a hard freely rotable wheel having a radiused peripheral edge between flanks 220, 222 on opposite sides of the wheel. The flanks 220, 222 are tapered towards the peripheral edge 218 at an angle of between 10 degrees and 45 degrees, so that, adjacent to the edge, the wheel has a V-shaped cross-section. The radiused edge of the wheel blends into the flanks of the wheel, and the radius of curvature of the edge is chosen, in proportion to the intended depth of the groove to be rolled, to give a suitable amount of displaced material to form flanges of suitable size adjacent the groove.

The supporting tool 210 could be a groove-forming wheel similar to and positioned diametrically opposite the tool 208, but in his embodiment is a freely rotatable wheel having a generally cylindrical peripheral working surface which is relieved circumferentially between its ends by annular recess 224. Cylindrical end portions of the tool 210 support the stem blank at axially spaced positions while the groove-forming tool 208 acts on the blank opposite the annular recess 224. The flanges 212, 214 are therefore accommodated in the recess 224.

Figure 12:
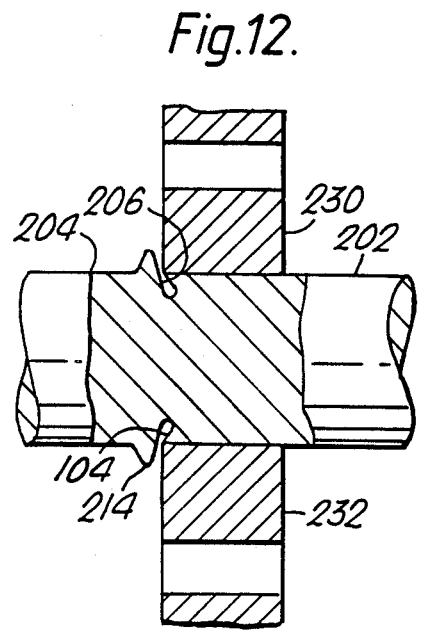

In a second stage, one of the flanges is then rolled down using a second pair of tools, so as to cause the material of that flange to flow across the mouth of the groove 206 towards the other side of the groove and appropriately not less than half the total distance, and thus form a first lip, as shown in FIG. 12.

Figure 13:
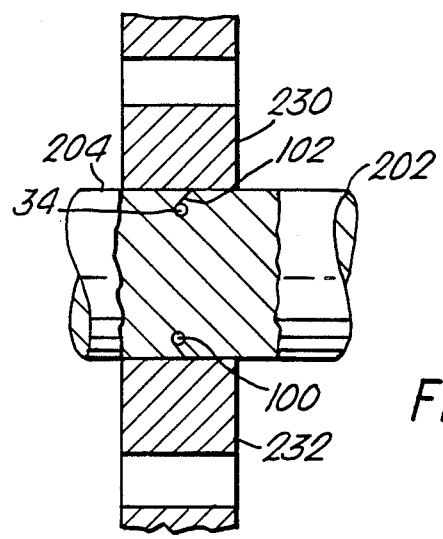

In a third, final stage, the other flange is then rolled down in a similar manner, causing it to flow across the mouth of the groove 206 until it meets and passes at least slightly beyond the nearest part of the first lip, thus forming a second lip, as shown in FIG. 13. The second lip to be formed will always tend to overlap the first formed lip, provided it is not given a particular bias such as to cause it to flow under the first lip formed.

As shown in FIGS. 12 and 13, the second tools, used for rolling down each of the flanges displaced from the breaker groove, can be a pair or pairs of flange-rolling wheels 230, 232 each freely rotable about an axis and having a cylindrical peripheral surface to engage and roll down each of the flanges in turn. The second tools 230, 222 can be rotated about axes parallel to the axis of the stem, and then form a cylindrical surface.

In forming the stem 14 of the fastener 10, it is however convenient to form other features of the stem comittently with the formation of the breaker groove. These other features include, in particular, the locking groove 110 which is close to the breaker groove, and the tapered portion 92 which extends axially beyond both sides of the groove and, on the plug side, as far as the locking groove.

Figure 14A:
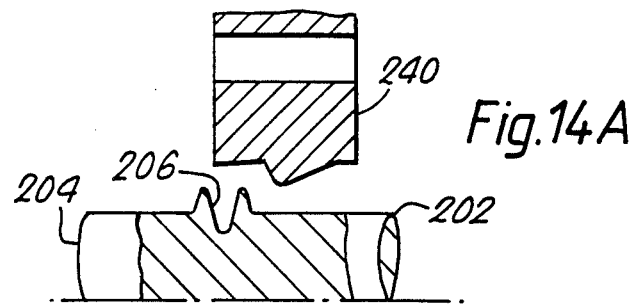
FIGS. 14A and 14B show early and late phases of a modified second stage of the method.
Figure 14B:
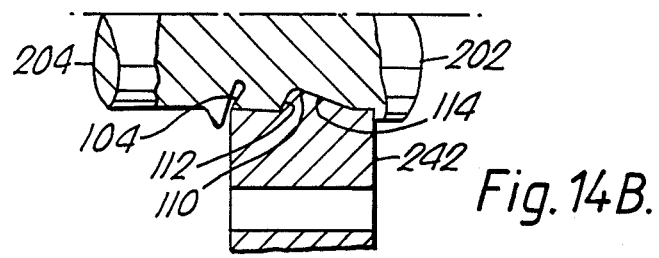

Thus, in a modified second stage, the locking groove 110 is formed by the action of rolling the grooved and flanged blank formed at the stage shown in FIG. 11 between a pair of identical profiled tools 240, 242, shown in FIGS. 14A and 14B, which are profiled to simultaneously form the locking groove 110 having a steep locking flank 112 and a blending flank 114, and to roll down one of the flanges. FIG. 14A shows the tool 240 and the blank prior to beginning the second stage, and FIG. 14B shows the tool 242 and blank on its completion.

Figure 15A:
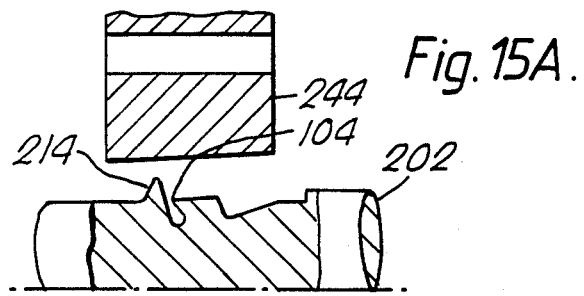
FIGS. 15A and 15B show early and final phases of a modified third stage of the method.
Figure 15B:
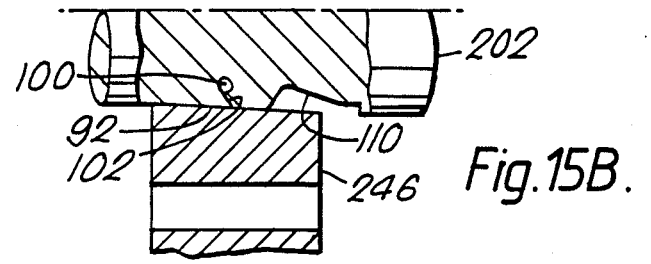

Furthermore, in forming the breaker groove 100 of the stem 14, the lip 104 of the plug 32 is rolled into position first as shown in FIG. 14B, and subsequently, in a modified third and final stage shown in FIGS. 15A and 15B, the lip 102 of the stem-tail 30 is rolled into position so that it slightly overlaps the lip 104 as shown in FIG. 15B. By forming the locking groove prior to closing the breaker groove, sufficient material can be displaced from both the locking groove and the breaker groove to be available for the subsequent formation of the lip 104 and to provide for the required progressive increase in diameter of the stem through the tapered region 92. In addition, a substantial volume of material of the stem lying between the locking flank 112 of the locking groove and the breaker groove 100 can be moved part-way into the breaker groove, so that the first formed lip 104 of the breaker groove apparently assumes a more massive size as shown in FIG. 14b, and therefore serves better to butress the subsequently rolled overlying lip 102 against the effect of inward pressures which it will encounter during installation of the fastener 10.

Thus, in the modified third stage, the flange 214 on the stemtail-blank is rolled down to form the lip 102, using a pair of flange-rollers 244, 246 which are profiled not only to roll the lip 102 into position but to finish the external surface of the tapered portion 92 to a smooth taper on completion of the modified third stage as shown in FIG. 15B.

Instead of using rotatable wheels for forming individual features of the stem 14, a number of individual features can be formed in a single continuous rolling operation using a pair of suitably profiled flat-bed dies which are mounted for reciprocation in a generally conventional thread rolling machine with their profiled surfaces facing, so that a suitable stem-blank can be rolled between the dies in a generally known manner.

The profiling of such dies would of course be made appropriate, in a manner well understood by those skilled in the art, to performing the several individual rolling operations desired, including forming and closing the breaker groove, and forming other desired features such as the locking groove, the pulling grooves, the assembly grooves, and the tapered portion 92.

The invention is not restricted to the details of the foregoing embodiments.

We claim:

1. A method of making a stem for a self-plugging blind fastener, which method comprises first forming a stem-blank comprising a plug-blank and a stem-tail blank, and then rolling the stem-blank between suitably profiled tools to form an annular groove between the plug-blank and the stem-tail blank, and thereby forming a breakneck which connects the plug-blank to the stem-tail blank and two circumferential flanges adjacent to said annular groove, said flanges being formed out of material displaced from the groove, one of said flanges being formed on the plug-blank, and the other of said flanges being formed on said stem-tail blank, and then rolling said one of said flanges on the plug-blank to form a first lip which overhangs the groove, and then rolling said other of said flanges on the stem-tail blank to form a second lip which overhangs the groove and overlaps the first lip.

2. The method of claim 1 including the step of forming a locking groove in said plug-blank.

3. The method of claim 2 wherein the step of forming a locking groove is performed simultaneously with said step of rolling the flange on the plug-blank.

4. The method of claim 3 wherein said step of forming said locking groove and said step of rolling the flange on the plug-blank together comprise pressing against the stem a profile tool having profiles for forming said locking groove and rolling the flange on the plug-blank.

* * * * *

UNITED STATES PATENT AND TRADEMARK OFFICE
CERTIFICATE OF CORRECTION

PATENT NO. : 4,765,010
DATED : Aug. 23, 1988
INVENTOR(S) : Harvey P. JEAL, et al.

It is certified that error appears in the above-identified patent and that said Letters Patent is hereby corrected as shown below:

[73] Assignee: "Advel" should be --Avdel--.

Signed and Sealed this

Twenty-third Day of May, 1989

Attest:

DONALD J. QUIGG

*Attesting Officer*   *Commissioner of Patents and Trademarks*